United States Patent Office 2,704,755
Patented Mar. 22, 1955

2,704,755

POLYNUCLEAR CYANINE DYES

John David Kendall and George Frank Duffin, Ilford, England, assignors to Ilford Limited, Ilford, England, a British company No Drawing. Application February 8, 1954,
Serial No. 408,994

Claims priority, application Great Britain
February 25, 1953

5 Claims. (Cl. 260—240.1)

This invention relates to cyanine dyes and particularly to cyanine dyes which contain an iminazolenine ring system. The invention further relates to photographic silver halide emulsions containing such dyes as optical sensitisers.

According to the present invention there are provided cyanine dyes of the general Formula I:

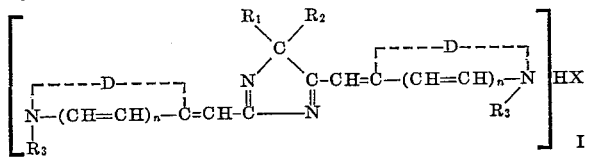

where $R_1$ and $R_2$ are alkyl groups or together form an aliphatic carbocyclic system, $R_3$ represents an alkyl, hydroxyalkyl or carboxyalkyl group, $n$ is 0 or 1 and D represents the residue of a 5-membered or 6-membered heterocyclic nitrogen compound, the two symbols D and the two symbols $n$ having, in any particular compound, the same significance, and X is an acid radicle.

The substituents $R_1$ and $R_2$ are preferably lower alkyl groups, such as methyl or ethyl groups, or an alicyclic group, such as cyclopentamethylene, but they may be higher alkyl groups. The $R_3$ groups are each preferably a lower alkyl group, such as methyl or ethyl, or a hydroxyalkyl group, such as β-hydroxyethyl or γ-hydroxypropyl. X may be any acid radicle, for example halide (chloride, bromide, iodide), sulphate, sulphamate, perchlorate or p-toluene sulphonate.

D may be the residue of any 5-membered or 6-membered heterocyclic ring system including thiazoles, oxazoles, selenazoles and their polycyclic homologues such as those of the benzene, naphthalene, acenaphthene and anthracene series; pyridine and its polycyclic homologues, such as quinoline and α- and β-naphthoquinolines; indolenines; diazines such as pyrimidines and quinazolines; diazoles (e. g. thio-ββ'-diazole); oxazolines, thiazolines and selenazolines. The polycyclic compounds of these series may be substituted in the carbocyclic rings with one or more groups such as alkyl, aryl, amino, hydroxy, alkoxy and methylene dioxy groups, or by halogen atoms.

According to a further feature of this invention, compounds of the said general Formula I are prepared by condensing a compound of the general Formula II:

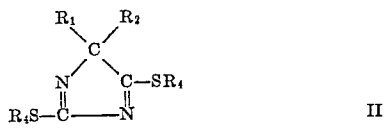

with at least two molecular equivalents of a compound of the general Formula III;

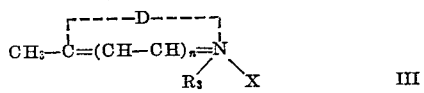

In the foregoing Formula II the two groups $R_4$ are selected from hydrogen and alkyl, but are not both hydrogen, i. e. both may be alkyl or one may be hydrogen and the other alkyl.

The best yields of the required products are obtained when both the groups $R_4$ are lower alkyl groups and the reaction is carried out by heating the reagents together in an inert solvent, e. g. an alcohol, of which anhydrous cyclohexanol is preferred, though the reaction may also be carried out in a solvent medium which is a weak base, e. g. pyridine. The dyes can be converted by prolonged heating with caustic alkali or alkali alkoxide into the corresponding bases, i. e. compounds of Formula I in which the HX is omitted. The dyes may be converted into quaternary salts of the general Formula IV:

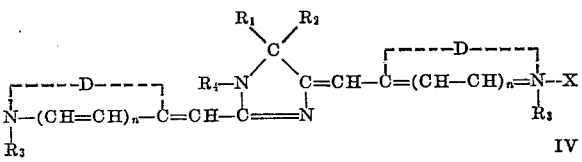

by fusion with an alkyl toluene sulphonate ($R_4X$) at an elevated temperature, $R_4$ being an alkyl group. These quaternary salts may also be prepared directly from the iminazolenine of Formula II, where $R_4$ is an alkyl group, by quaternising and then reacting with at least two equivalents of the quaternary salt of a compound containing a reactive methyl group in the presence of a strong base such as triethylamine. The quaternisation of the iminazolenine must occur on the 1-nitrogen, resulting in $R_4$ being on that nitrogen in the final quaternary-salt-dye of Formula IV, as only quaternisation at this position would make both $R_4S$ groups reactive. This latter point proves the structure of the quaternary-salt-dyes.

The compounds of Formula I are in general powerful sensitisers for photographic emulsions, and particularly gelatino silver chloride emulsions, and many of them have also useful sensitising properties in connection with gelatino silver iodobromide emulsions. In general the dyes are more powerful sensitising compounds than the related quaternary salts represented by Formula IV above.

The 2:4-dialkylthioiminazolenines of Formula II used as starting materials may be prepared from the corresponding dithiohydantoins which, in turn, are obtained by the method of Carrington, J. Chem. Soc., 1947, 681.

The following exemplifies the procedure: 5:5-dimethyldithiohydantoin (143 g.) was dissolved in 10% aqueous sodium hydroxide (2500 cc.) at 15° and dimethyl sulphate (254 cc.) added with stirring at 15–20° during 20 minutes. After a further 1½ hours at 20° the precipitated oil was extracted with ether, washed well with water, dried over potassium carbonate and distilled. The pure 5:5-dimethyl-2:4-dimethylthioiminazolenine distilled as a very pale yellow oil, B. Pt. 85–90°/1.5 mm.

The following compounds were prepared by a similar method:

5:5 - cyclopentamethylene - 2:4 - dimethylthioiminazolenine as a pale yellow oil, B. Pt. 116–118° 0.5 mm.

5:5 - dimethyl - 2:4 - diethylthioiminazolenine as a colourless oil, B. Pt. 95–100° 0.1 mm.

5-ethyl-5-methyl-2:4-dimethylthioiminazolenine as a pale yellow oil, B. Pt. 95–97° 0.1 mm.

5:5-diethyl-2:4-dimethylthioiminazolenine as a pale yellow oil, B. Pt. 86–93° 15 mm.

5:5 - dimethyl - 4 - mercapto-2-methylthioiminazolenine was prepared by the method of Hazard et al., Bull. Soc. Chim., 16, (5), 33, (1949).

5:5 - dimethyl - 2 - mercapto-4-methylthioiminazolenine was prepared by the method of Hazard et al., loc. cit., and 5:5 - dimethyl - 4 - ethylthio - 2 - mercaptoiminazolenine by a similar method as a thick pale yellow oil, which could not be induced to crystallise.

The following examples will serve to illustrate the invention but are not to be regarded as limiting it in any way:

EXAMPLE 1

2:4 - di[(2':3' - dihydro - 3' - ethylbenzothiazolylidene-2')methyl] 5:5-dimethyliminazolenine hydroiodide (a) 5:5 - dimethyl - 2:4 - dimethylthio - iminazolenine (0.94 g.) and 2methylbenzothiazole ethiodide (3.0 g.) were refluxed in cyclohexanol (15 cc.) for two hours. The resulting intense yellow solution was diluted with water (100 cc.), sufficient ethanol added to produce a homogeneous solution and then left overnight, during which time a crystalline precipitate was formed. After filtration and recrystallisation from methanol the pure dye was obtained as glistening orange-yellow needles, m. pt. 284°.

(b) Using the same quantities of reactants as in (a) except that pyridine (10 cc.) was used in place of cyclohexanol, three hours' boiling produced a deep yellow solution, which on pouring into 2% sodium iodide yielded a copious yellow solid. After filtering and recrystallising from methanol the same pure dye was obtained as in (a) above.

The same dye was obtained:
(c) By reacting 5:5-dimethyl-2-mercapto-4-methyl-thioiminazolenine (0.87 g.) and 2-methylbenzothiazole ethiodide (3.0 g.) as in (b).
(d) By reacting 5:5-dimethyl-4-mercapto-2-methyl-thioiminazolenine (0.87 g.) and 2-methylbenzothiazole ethiodide (3.0 g.) as in (b).
(e) By reacting 2:4-diethylthio-5:5-dimethyliminazolenine (1.08 g.) and 2-methylbenzothiazole ethiodide (3.0 g.) as in (a).
(f) By reacting 5:5-dimethyl-4-ethylthio-2-mercapto-iminazolenine (0.72 g.) and 2-methylbenzothiazole ethiodide (2.3 g.) as in (b).
(g) By reacting the same quantities as in (b) but using ethylene glycol monomethyl ether (20 cc.) as the solvent.
(h) By reacting the same quantities as in (b) but using ethanol (20 cc.) as the solvent.

This dye, which shows a powerful greenish fluorescence in solution, extends the sensitivity of a silver chloride emulsion to 5200 Å. with a maximum at 4850 Å.

EXAMPLE 2

*5:5 - cyclopentamethylene-2:4-di[(2':3'-dihydro-3'-ethyl-benzothiazolylidene-2')methyl]-iminazolenine hydroperchlorate*

5:5-cyclopentamethylene - 2:4 - dimethylthioiminazolenine (12 g.) and 2-methylbenzothiazole ethiodide (3.0 g.) were refluxed in cyclohexanol (15 cc.) for two hours. The resulting intense yellow solution was poured into 4% sodium perchlorate (100 cc.) and ethanol added to produce a homogeneous solution. A mass of yellow crystals were rapidly deposited which were filtered off and recrystallised from ethanol to yield the pure dye as orange-yellow plates, M. Pt. 296° (d).

This dye extends the sensitivity of a silver chloride emulsion to 5300Å. with a maximum at 4900 Å.

EXAMPLE 3

*2:4 - di[(5' - chloro - 2':3' - dihydro - 3' - ethylbenzothiazolylidene - 2')methyl]-5:5-dimethyliminazolenine hydroiodide*

5:5-dimethyl-2:4-dimethylthioiminazolenine (0.48 g.) and 5-chloro-2-methylbenzothiazole ethiodide (1.7 g.) were refluxed in pyridine (10 cc.) for one hour. The resulting yellow solution was poured into water, when a solid was precipitated. After filtration and recrystallisation the pure dye was obtained as orange-yellow leaflets, M. Pt. 313°.

This dye extends the sensitivity of a silver chloride emulsion to 5250 Å. with a maximum at 4900 Å.

EXAMPLE 4

*2:4-di[2':3' - dihydro - 3':5' - dimethylbenzoselenazolylidene - 2')methyl] - 5:5-dimethyliminazolenine hydro-iodide*

2:5-dimethylbenzoselenazole (1.05 g.) and methyl p-toluene sulphonate (0.93 g.) were fused at 140° for one hour. The melt was dissolved in pyridine (10 cc.) and 5:5-dimethyl-2:4-dimethylthioiminazolenine (0.48 g.) added. After boiling for one hour, the resulting yellow solution was poured into 2% aqueous sodium iodide (100 cc.) to precipitate an orange-yellow solid. This was filtered off and boiled out with methanol to leave the pure dye as orange leaflets, M. Pt. 334°.

This dye extends the sensitivity of a silver chloride emulsion to 5400 Å. with a maximum at 5150 Å.

EXAMPLE 5

*2:4 - di[(2':3' - dihydro - 3':5' - dimethylbenzothiazolylidene - 2')methyl] - 5:5 - dimethyliminazolenine hydroiodide*

2:5-dimethylbenzothiazole (0.82 g.) and methyl p-toluene sulphonate (0.93 g.) were fused at 140° for one hour. The melt was dissolved in pyridine (10 cc.) and 5:5-dimethyl-2:4-dimethylthioiminazolenine (0.48 g.) added. After refluxing for one hour, the resulting yellow solution was poured into 2% aqueous sodium iodide solution (100 cc.) to precipitate an orange-yellow solid. This was filtered off and boiled out with methanol to leave the pure dye as orange-yellow microcrystals, M. Pt. 335°.

This dye extends the sensitivity of a silver chloride emulsion to 5400 Å. with a maximum at 5150 Å.

EXAMPLE 6

*2:4 - di[(2':3' - dihydro - 3' - methylbenzothiazolylidene-2')methyl]-5:5-dimethyliminazolenine hydroiodide*

5:5-dimethyl-2:4-dimethylthioiminazolenine (0.94 g.) and 2-methylbenzothiazole methiodide (2.8 g.) were refluxed in pyridine (10 cc.) for one hour. On pouring into water a solid was precipitated which, after filtration and recrystallisation from methanol, yielded the pure dye as glistening yellow needles, M. Pt. 323°.

This dye extends the sensitivity of a silver chloride emulsion to 5200 Å. with maxima at 4400 Å. and 4900 Å.

EXAMPLE 7

*2:4 - di[(1':2' - dihydro - 1' - ethylquinolinylidene - 2')-methyl]-5:5-dimethyliminazolenine hydroiodide*

Quinaldine ethiodide (2.9 g.) and 5:5-dimethyl-2:4-dimethylthioiminazolenine (0.94 g.) were refluxed in cyclohexanol (15 cc.) for two hours. The resulting orange solution was poured into 3% aqueous sodium iodide (100 cc.) and ethanol added to produce a homogeneous solution. An orange crystalline precipitate formed rapidly and after one hour this was filtered and recrystallised from methanol to yield the pure dye as orange needles, M. Pt. 308°.

This dye sensitises a silver chloride emulsion from 4600° Å. to 6000 Å. with maxima at about 5200 Å. and about 5550 Å.

EXAMPLE 8

*2:4 - di[(2':3' - dihydro - 3' - ethylbenzoxazolylidene-2')methyl]-5:5-dimethyliminazolenine hydroperchlorate*

2-methylbenzoxazole ethiodide (2.89 g.) and 5:5-dimethyl-2:4-dimethylthioiminazolenine (0.94 g.) were refluxed in cyclohexanol (15 cc.) for two hours. The resulting almost colourless solution was poured into 4% aqueous sodium perchlorate (100 cc.) and then evaporated under reduced pressure to dryness. On adding water (20 cc.) to the solid residue a rather sticky solid remained undissolved, the solid was lixiviated with ether when it crystallised well. Recrystallisation from water yielded the pure product as colourless plates, M. Pt. 207–208°.

EXAMPLE 9

*2:4 - di[(1':2' - dihydro - 1':3'3' - trimethylindoleninylidene)methyl] - 5:5 - dimethyliminazolenine hydroperchlorate*

2:3:3-trimethylindolenine methiodide (3.01 g.) and 5:5-dimethyl-2:4-dimethylthioiminazolenine (0.94 g.) were refluxed in cyclohexanol (15 cc.) for two hours to give a yellow solution. This was poured into 4% aqueous sodium perchlorate (100 cc.) and ethanol added to give a homogeneous solution. After leaving overnight the precipitated crystals were filtered off and recrystallised from methanol to give the pure dye as pale yellow plates, M. Pt. 198°.

EXAMPLE 10

*2:4-di[(1':4'-dihydro-1'-ethylquinolinylidene)methyl]-5:5-dimethyliminazolenine hydroiodide*

Lepidine ethiodide (2.9 g.) and 5:5-dimethyl-2:4-dimethylthioiminazolenine (0.94 g.) were refluxed in cyclohexanol (15 cc.) for two hours. The resulting purple solution was poured into 4% aqueous sodium iodide (100 cc.) and ethanol added to produce a homogeneous solution which was left overnight. The precipitated solid was then filtered off and recrystallized from ethanol to yield the dye as glistening bronze leaflets, M. Pt. 294°.

The dye sensitises an iodobromide emulsion, extending to 6900 A. with maxima at about 6200 A. and 6700 A.

EXAMPLE 11

*2:4 - di[(2':3' - dihydro - 3'-ethyl-5'-methylbenzothiazolylidene-2')methyl]-5:5-dimethyliminazolenine hydroiodide*

2:5-dimethylbenzothiazole ethiodide (3:15 g.) and 5:5-dimethyl-2:4-dimethylthioiminazolenine (0.94 g.) were refluxed in cyclohexanol (15 cc.) for two hours. The resulting orange solution was poured into 4% sodium iodide solution (100 cc.) and ethanol added to give a homogeneous solution. A crystalline precipitate was rapidly deposited which was filtered off and recrystallised from chloroformbenzene to yield the pure dye as orange leaflets, M. Pt. 326°.

The dye is a sensitiser for silver chloride emulsions, extending the sensitivity to 5300 Å. with a maximum at about 4900 Å.

EXAMPLE 12

*2:4-di-[(2':3'-dihydro-3'-ethylbenzothiazolylidene-2')-methyl]-5:5-dimethyliminazolenine*

The dye from Example 1 (2.05 g.), potassium hydroxide (1.87 g.) and ethanol (70 cc.) were heated under reflux for four hours. Dilution with water (100 cc.) precipitated a yellow solid which was filtered off and recrystallised from ethanol to give the pure product as yellow needles, M. Pt. 259°.

This product sensitises a silver chloride photographic emulsion substantially as the parent dye of Example 1.

EXAMPLE 13

*2:4-di-[(2':3'-dihydro-3'-methylbenzothiazolidene-2')-methyl]-5:5-dimethyliminazolenine*

The dye from Example 6 (1.28 g.), potassium hydroxide (1.2 g.) and ethanol (45 cc.) were heated under reflux for 20 hours, diluted well with water and the precipitated solid filtered off and boiled out with methanol to leave the pure product as yellow micro needles, M. Pt. 314°.

This product sensitises a silver chloride photographic emulsion substantially as the parent dye of Example 6.

EXAMPLE 14

*[2 - (2':3'-dihydro-3'-methylbenzothiazolylidene-2'-methyl)-1:5:5-trimethyliminazolenine-4]-(3" - methylbenzothiazole-2")-monomethine cyanine iodide*

The dye from Example 6 (0.2 g.) and methyl p-toluene sulphonate (0.8 g.) were fused at 150° for five hours. The melt was then dissolved in pyridine (20 cc.) and poured into 4% aqueous sodium iodide (50 cc.) to precipitate an orange solid which was filtered off and boiled out with methanol to give the pure product as orange needles with a blue reflex, M. Pt. 324° (d).

By way of comparison, the same dye was made by the following method:

2-methylbenzothiazole (1.49 g.), methyl p-toluene sulphonate (3.85 g.) and 5:5-dimethyl-2:4-dimethylthioiminazolenine (0.78 g.) were fused for one hour at 140°. Pyridine (20 cc.) and triethylamine (5 cc.) were added and the mixture refluxed for one hour. On pouring into 5% aqueous sodium iodide (100 cc.), an orange solid was rapidly precipitated which was filtered off and boiled out with ethanol to leave the pure product as orange needles, M. Pt. 324° (d).

The identity of the products establishes their structure to be that of general Formula IV.

This dye extends the sensitivity of a silver iodobromide emulsion to 6000 Å. with a maxima at 5800 Å.

EXAMPLE 15

*[2 -(2':3'-dihydro-3'-ethylbenzothiazolylidene-2'-methyl)-5:5 - dimethyl-1-ethyliminazolenine-4]-(3"-ethylbenzothiazole-2")-monomethine cyanine iodide*

The dye from Example 1 (0.85 g.) and ethyl p-toluene sulphonate (3.4 g.) were fused at 150° for five hours. The melt was then dissolved in pyridine (15 cc.) and poured into 4% aqueous sodium iodide (100 cc.) when a solid was slowly precipitated. After filtering and recrystallising from ethanol, the pure product was obtained as orange needles, M. Pt. 242°.

By way of comparison, the same dye was made by the following method:

2:4-diethylthio-5:5-dimethyliminazolenine (1.08 g.), 2-methylbenzothiazole (4.0 g.) and ethyl p-toluene sulphonate (4.0 g.) were fused at 150° for three hours. Pyridine (20 cc.) and triethylamine (5 cc.) were added and the mixture refluxed for one hour. On pouring into 4% aqueous sodium iodide (100 cc.) a solid was slowly precipitated which was filtered off and recrystallised from ethanol to give the pure dye as orange needles, M. Pt. 242°.

The identity of the products establishes the structure to be that of general Formula IV.

This dye extends the sensitivity of a silver chloride emulsion to 5750 Å. with a maximum at 5100 Å.

The following dyes were obtained by a process similar to that of Example 1(a).

EXAMPLE 16

*5:5-diethyl-2:4-di-[(2':3'-dihydro-3'ethylbenzothiazolylidene-2')methyl]-iminazolenine hydroperchlorate*

Orange needles, M. Pt. 226° from ethanol.

This dye sensitises a silver chloride emulsion to 4600 Å. with a maximum at 4300 Å.

EXAMPLE 17

*2:4 - di - [(2':3' - dihydro-3'-ethylbenzothiazolylidene-2') methyl] - 5 - methyl - 5 - methyliminazolenine hydroperchlorate*

Orange needles, M. Pt. 201° from ethanol.

This dye sensitises a silver chloride emulsion to 5050 Å. with a maximum at 4800 Å.

EXAMPLE 18

*2:4 - di - [(2':3'-dihydro-5':6'-dimethoxy-3'-ethylbenzothiazolylidene-2')methyl]-5:5 - dimethyliminazolenine hydroiodide*

Orange needles, M. Pt. 258° from ethanol.

This dye sensitises a silver chloride emulsion to 5450 Å. with a maximum at 5000 Å.

What we claim is:

1. Cyanine dyes selected from the class consisting of salts of the general formula:

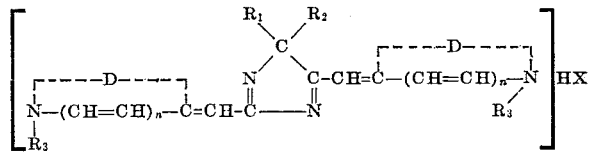

where $R_1$ and $R_2$ taken separately are alkyl groups and taken together form, with the carbon atom to which they are linked, a cyclohexane ring system, $R_3$ is selected from the class consisting of alkyl, hydroxyalkyl and carboxyalkyl groups, $n$ is selected from 0 to 1 and D is a residue selected from the residues of 5-membered and 6-membered heterocyclic nitrogen compounds, the two symbols D and the two symbols $n$ having, in any particular compound, the same significance, and X is an acid radicle, and the corresponding bases.

2. Process for the production of a cyanine dye salt of the general formula:

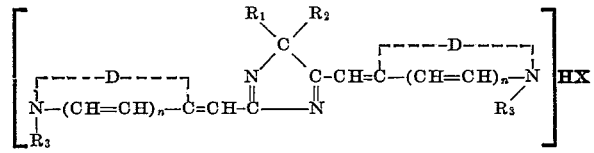

where $R_1$ and $R_2$ taken separately are alkyl groups and taken together form, with the carbon atom to which they are linked, a cyclohexane ring system, $R_3$ is selected from the class consisting of alkyl, hydroxyalkyl and carboxyalkyl groups, $n$ is selected from 0 and 1 and D is a residue selected from the residues of 5-membered and 6-membered heterocyclic nitrogen compounds, the two symbols D and the two symbols $n$ having, in any particular compound, the same significance, and X is an acid radicle, which comprises condensing a compound of the general formula:

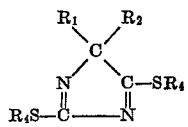

with at least two molecular equivalents of a compound of the general formula:

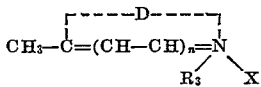

where $R_4$ is selected from the class consisting of the hydrogen atom and alkyl groups, at least one of the $R_4$ groups being alkyl.

3. Process for the production of a cyanine dye salt of the general formula:

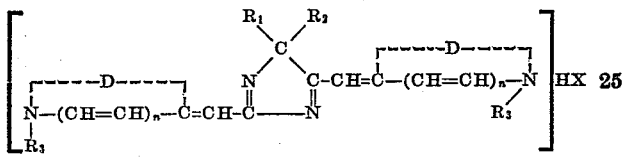

where $R_1$ and $R_2$ taken separately are alkyl groups and taken together form, with the carbon atom to which they are linked, a cyclohexane ring system, $R_3$ is selected from the class consisting of alkyl, hydroxyalkyl and carboxyalkyl groups, $n$ is selected from 0 and 1 and D is a residue selected from the residues of 5-membered and 6-membered heterocyclic nitrogen compounds, the two symbols D and the two symbols $n$ having, in any particular compound, the same significance, and X is an acid radicle, which comprises condensing a compound of the general formula:

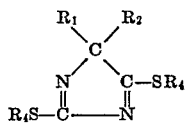

with at least two molecular equivalents of a compound of the general formula:

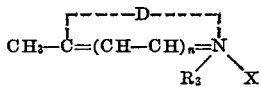

where $R_4$ is selected from the class consisting of the hydrogen atom and alkyl groups, at least one of the $R_4$ groups being alkyl, the reaction being carried out by heating the reagents together in an inert solvent medium.

4. Process for the production of a cyanine dye salt of the general formula:

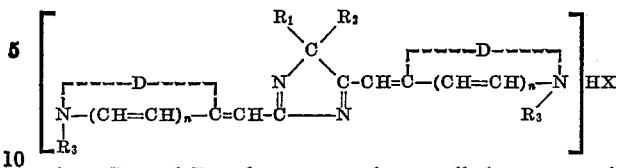

where $R_1$ and $R_2$ taken separately are alkyl groups and taken together form, with the carbon atom to which they are linked, a cyclohexane ring system, $R_3$ is selected from the class consisting of alkyl, hydroxyalkyl and carboxyalkyl groups, $n$ is selected from 0 and 1 and D is a residue selected from the residues of 5-membered and 6-membered heterocyclic nitrogen compounds, the two symbols D and the two symbols $n$ having, in any particular compound, the same significance, and X is an acid radicle, which comprises condensing a compound of the general formula:

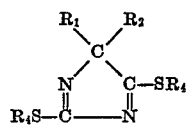

with at least two molecular equivalents of a compound of the general formula:

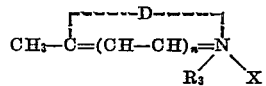

where $R_4$ is selected from the class consisting of the hydrogen atom and alkyl groups, at least one of the $R_4$ groups being alkyl, the reagents being refluxed together in anhydrous cyclohexanol.

5. Process for the production of a cyanine dye base which comprises forming a dye salt as claimed in claim 2 and treating it with strong alkali.

References Cited in the file of this patent

UNITED STATES PATENTS

| | | |
|---|---|---|
| 2,166,736 | White et al. | July 18, 1939 |
| 2,263,749 | White et al. | Nov. 25, 1941 |
| 2,320,654 | Riester | June 1, 1943 |
| 2,322,015 | Hamer et al. | June 15, 1943 |
| 2,338,782 | Riester | Jan. 11, 1944 |
| 2,340,882 | Kendall | Feb. 8, 1944 |
| 2,353,164 | Kendall et al. | July 11, 1944 |

OTHER REFERENCES

Chem. Abst., 16:3101 (Abstract of Brit. Med. Jour., 1922, I, 514–15).

Chem. Abst., 19:530 (Abstract of Proc. Roy. Soc., London, 96B, 317–33, 1924).